United States Patent Office.

WILLIAM H. F. KEHRWIEDER, OF PHILADELPHIA, PENNSYLVANIA.

Letters Patent No. 105,809, dated July 26, 1870.

IMPROVEMENT IN COMPOSITION FOR "ENCAUSTIC" PAINTING.

The Schedule referred to in these Letters Patent and making part of the same.

*To all whom it may concern:*

Be it known that I, WILLIAM H. F. KEHRWIEDER, of the city and county of Philadelphia, and State of Pennsylvania, have invented a new and useful Encaustic Preparation for Painting; and I do hereby declare the following to be a full, clear, and exact description thereof, sufficient to enable others skilled in the art to which my invention appertains to fully understand and use the same.

In carrying out my invention, I take linseed-oil, gum dammar, and bees-wax. I dissolve about thirty-four parts of gum dammar and sixteen parts of wax in about fifty parts of oil, and add thereto, in a heated state, say, one hundred parts of turpentine.

Pigment or color, of the desired kind, is then added to and ground in the compound, or pigment or color ground in oil may be added to said compound.

If the product of such combination is too thick, I add more of the compound.

I thus produce an article applicable as the last or finishing coat or coats in painting walls, wood-work, &c., and combine durability and beauty therein.

The surface is not affected in the least by soap and water, and at all times will be found to retain its strength, color, and body.

Having thus described my invention,

What I claim as new, and desire to secure by Letters Patent, is—

1. The encaustic preparation, consisting of the within-named ingredients.

2. The within-described preparation, consisting of the ingredients and compounded in the manner substantially as set forth.

To the above I have signed my name this 14th day of July, 1870.

WILLIAM H. F. KEHRWIEDER.

Witnesses:
JAMES L. NORRIS,
JOHN A. WIEDERSHEIM